June 30, 1964  SOROKU AMANO  3,139,526
PLANE SLIPPING TYPE BODY SECTION RADIOGRAPHIC APPARATUS
Filed Dec. 12, 1960  7 Sheets-Sheet 1

Soroku Amano
INVENTOR.

BY Blum, Moscovitz, Friedman & Blum
Attorneys

Fig.9A (I)     (II)     (III)     (IV)

June 30, 1964    SOROKU AMANO    3,139,526
PLANE SLIPPING TYPE BODY SECTION RADIOGRAPHIC APPARATUS
Filed Dec. 12, 1960    7 Sheets-Sheet 6

Soroku Amano
INVENTOR.

BY
Blum, Moscovitz, Friedman, & Blum
Attorneys

3,139,526
PLANE SLIPPING TYPE BODY SECTION RADIOGRAPHIC APPARATUS
Soroku Amano, 290 Ko, 6-chome, Seki-machi, Nerima-ku, Tokyo, Japan
Filed Dec. 12, 1960, Ser. No. 75,429
5 Claims. (Cl. 250—61.5)

This invention relates to an improvement in a body section radiographic apparatus, and particularly to apparatus of such a type as moves along two straight lines, at any angle to each other, on a plane surface.

In describing the function of the radiographic apparatus and construction herein illustrated, I make frequent use of the expression "slip." By this term, I intend to express a phenomenon in an image in the radiographic apparatus, the phenomenon being such that a section is in focus while the other sections are out of focus and faded so as to form a cloudy background. The "slip" corresponds to the relative movement of a tube and a sensitive material. "A slip angle" means a degree of slip, indicating a degree of inclination of a tube and also relating to a distance between the tube and a section. "A plane slipping type" radiographic apparatus to which this invention is directed means a type in which an apparatus moves along two straight lines, with any angle, on a plane surface.

As radiographic apparatus of the plane slipping type, the planigraph apparatus of the S-shaped slipping type, the apparatus of the circular slipping type, and those of the quadratic curve slipping type are well known. Though the planigraph apparatus has a mechanism such that a tube and a film may travel freely over a plane in any direction, it gives rise to many vibrations in case of changing the direction thereof because of one stroke movement by means of an S-shaped guide rail as shown in FIG. 1, and in addition its slipping becomes symmetrical with respect to a point (except the case of parallel lines where the symmetry with respect to a point is simultaneously the symmetry with respect to a line) so that its slip angle is small resulting in its being unable to carry out a sufficient plane slipping.

Figure 1:
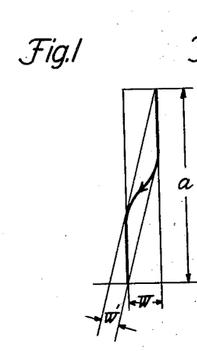
FIG. 1 is an analytic view of a conventional S-shaped slipping of body section radiographic apparatus.

Particularly speaking, as apparent from FIG. 1, the slipping in the planigraph apparatus is S-shaped symmetrical with respect to a point so that the slipping is not perfect if compared with a case of a symmetry with respect to angularly related lines such as X-, V-, or inverted and separated V-shaped slippings, and at the same time, for instance, there is a practical effective slippage W' of only 5 cm. wide with respect to an apparent parallel slippage W of 10 cm. wide so that the corresponding plane angular slippage (which is to be understood to mean an angular slippage in the direction of the Y-axis which is perpendicular to the X-axis in the main slipping direction) with respect to 130 cm. of the distance between a focus and a section becomes an insufficient value of only 2°. Although provision of a device for the proper facing of the Lysholm has not been contemplated, the strongest reason for the above is that the operation for converting the direction of movement of the tube is irrational inasmuch as the guidance is effected only by means of rails similar to the slipping form in shape, so that a sufficient plane slipping cannot be carried out with a smooth operation.

In the apparatus of the circular slipping type and those of the quadratic curve slipping type, there is a defect in that an obstacle shadow out of a section can not be deleted in case of photographing such an object as breast ribs having lines parallel with the slipping direction at some point around the entire circumference of 360°. In order to obviate such defect, it is, of course, possible to delete the obstacle shadow of ribs, which shadow is out of a section inclined at an angle of 45–90° to the back bone near the central part of lungs, by means of radiating X-ray within a lateral extent of an angle of 90° around a line in parallel with the back bone and also effecting a selective radiation so as to obstruct such radiation within a vertical extent of an angle of 90° being at right angles with the former radiating direction. However, in case where an obstacle shadow exists at a part inclined at an angle of less than 45° to the back bone, it frequently occurs that such an obstacle shadow appears if compared with a case of employing a conventional apparatus of the single direction slipping type because of the fact that there is always a part parallel to the slipping direction of the circular curve or the quadratic curve, resulting in inability to give full scope to the superiority of the effects attainable with the plane slipping type. It has been earnestly desired by those concerned that an apparatus be provided by which the plane slipping effect can be made large without the abovementioned defects and an increase in a rib obstacle shadow may come out as clearly as possible. However, a smoothly operative and highly precise apparatus has not been provided owing to practical mechanical difficulties.

The object of this invention is to provide a body section radiographic apparatus which is suited for body section radiographing for the breast, by which the disadvantages of the heretofore known plane slipping type can be obviated and the advantages of the plane slipping type can be obtained substantially with the least appearance of obstacle shadows.

Figures 2A, 2B:
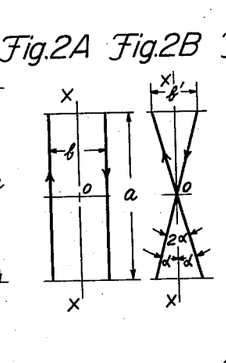
Figure 2C:
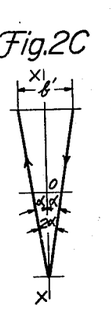
Figure 2D:
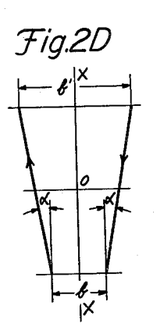

Briefly stated in accordance with the primary aspect of this invention, there is provided a tube on a tube mounting frame arranged such that it may be displaced freely in the direction of a Y-axis, said tube mounting frame being mounted on a guide plane frame arranged for linear reciprocating movement in the direction of an X-axis at right angles to said Y-axis, substituting said linear movement for a circular movement within a plane parallel to a sectional plane of an object to be radiographed, said displacement being guided along two linear lines which are parallel with each other or which cross one another symmetrically with respect to a line, as shown in FIGS. 2–A, 2–B, 2–C, 2–D etc., for each alternate stroke of said reciprocation during a non-radiating period, and said guidance being effected around two dead points of said circular movement near two ends of said reciprocating movement of said guide plane frame in the direction of said X-axis by means of a single rail which may be displaced in the direction of said Y-axis by means of a toggle mechanism which may be operated between another two dead points displaced 180° from each other, which are associated with said reciprocating movement in the direction of said X-axis but are asynchronous therewith. By virtue of this arrangement, it becomes possible to realize a movement of a tube along two parallel lines or two intersecting lines within a plane, providing for two-stroke reciprocation with a far smoother change in direction.

Figure 3:
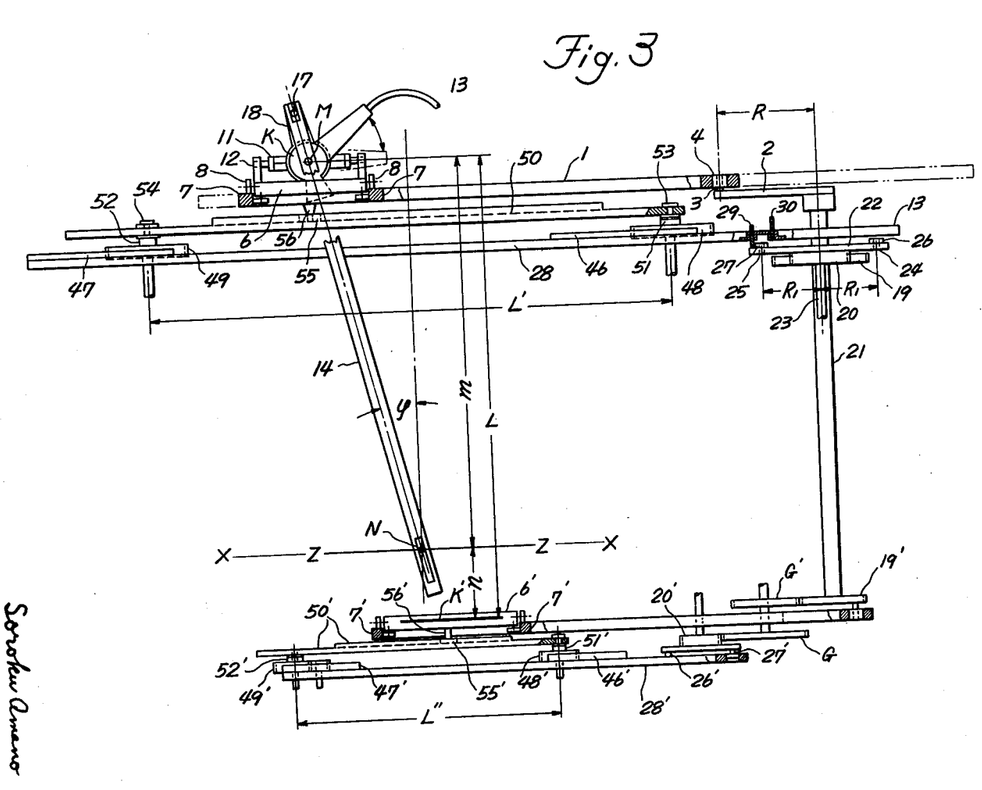
FIG. 3 is a front elevation showing the essential mechanism of the apparatus in accordance with this invention.
Figure 4:
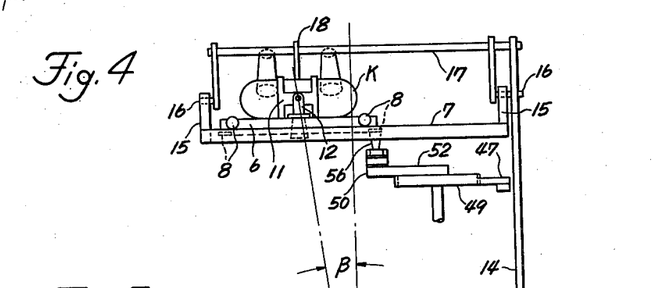
FIG. 4 is a left side elevation of a tube arrangement of the apparatus.

It is to be understood that it is natural that, in the case of slipping of two linear intersecting lines, the shadow of part of ribs having segments in parallel with the slipping direction is brought forth somewhat more by the intersecting angle $\pm\alpha$ with respect to the X-axis if compared with the parallel slipping type apparatus, and it is possible to make the degree of appearance of obstacle shadows substantially constant by means of adopting such a rather small value of $\alpha$ as 10°, with the case where selective radiation is effected by means of the circular slipping type within a lateral extent of an angle of about 30°, so that the angle may be made far smaller than in the case of the selective radiation of a lateral extent of angles of 90° to the center as in accordance with the circular slipping type. Furthermore, when the revolution angle is made small in the circular slipping type apparatus, the slipping angle $\varphi$ in the composite main slipping direction becomes small, while when the revolving radius of the tube is made large in order to make the slipping angle large, the angle of incidence $\beta$ becomes large, resulting in decreased accuracy and, in addition, in widening of the shadow of the back bone disadvantageously. In accordance with this invention, it is advantageously possible to select the slipping angle $\varphi$ and the angle of incidence $\beta$ suitably and independently of each other. In the specification, the expression of a slipping angle $\varphi$ means the main slipping angle in the direction of the X-axis, to be formulated by 2 tan$^{-1}$ $(a/2m)$ where $m$ represents a distance between sections to be focused, and the expression of an angle of incidence $\beta$ means the largest slipping angle in the direction of the Y-axis, to be formulated by $$2 \tan^{-1} ((b \text{ or } b')/2m)$$

where $m$ represents the same distance as above, as shown in FIGS. 3 and 4. Heretofore, only the movement of the tube has been considered, but it is necessary that a film be displaced in parallel with a section to be radiographed in such a manner that any point on the film, which corresponds to a point on the section of the object, becomes symmetrical with respect to the focal point of the tube, keeping a ratio in distances from the section of the object to the tube and to the film. However, it is not necessarily required in accordance with this invention to use mechanism similar to the tube adjusting mechanism as an associatedly operative mechanism for the film side, but it is enough to operatively associate a tube mounting frame with a cassette carriage which is displaceable in any direction but kept in parallel by means of a connecting rod which is rotatable on both the X-axis and the Y-axis such as a universal joint having a common supporting point on the section. On the contary, it may be also possible to use the mechanism in accordance with this invention for the film only, using the operative association by means of the connecting rod for the tube. However, it is convenient to use the mechanism in accordance with this invention for both the tube and the film in order to attach a "Lysholm" focusing device which will be described hereinafter.

In order to assure a perfect body section radiography, it is necessary to provide a "Lysholm" focusing device in addition to provision of the mechanism operatively associated with the tube and the film. In accordance with the secondary aspect of this invention, there is provided a grid in a sliding guide which is arranged to be always parallel with the longitudinal direction of the straight rails for guiding the film even while there is an inclination of the focusing device to the X-axis of the straight rails, said focusing device being attached to a hollow frame wheel supported at its circumference so as to be rotatable on the central axis of the cassette carriage, whereby the focusing devices are adapted to the slipping type having an intersection at the center as the X-shaped slipping, to the parallel slipping type by means of inclining the plane of the focusing device to the film plane towards the focal point by a ratio of the distance from the X-axis to a parallel line along which the focal point of the tube is displaced, to a distance between the focal point and the section, and to the V-shaped slipping and the inverted and separated V-shaped slipping by means of combining the above two means.

The invention will be better understood and other objects and additional advantages of the invention will become apparent upon perusal of the following description taken in connection with the drawings, and the scope of the invention will be defined in the appended claims.

In the drawings,

FIGS. 2–A, 2–B, 2–C, and 2–D are analytic views of slipping in accordance with this invention;

FIGS. 8–A, 8–B, 8–C, 8–D, and 8–E, are, respectively, a plan view and a front, a rear, a left side, and a right side elevation view, respectively, of an intermittent reciprocating means;

FIGS. 9–A and 9–B are schematic views for explaining the operation of the intermittent reciprocating motion;

FIGS. 10–A and 10–B are timing diagrams of the X-ray radiation;

Figure 5:
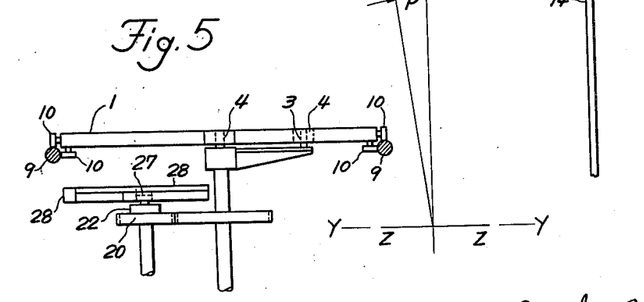
FIG. 5 is a right side elevation thereof.
Figure 6:
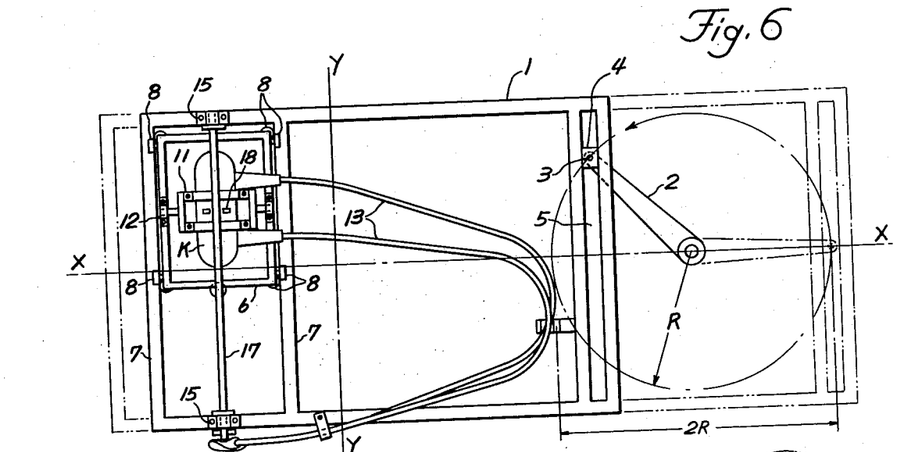
FIG. 6 is a plan view of a tube guide frame.

Referring more particularly to the drawings, the preferred embodiments of this invention will now be described; however, this description will be understood to be illustrative of this invention and not as limiting it to the particular construction shown and described. There is a tube guide frame 1. Circular motion of a pin 3 at a radius R on a rotary arm 2 rotated by some driving means (not shown) is converted into straight reciprocating motion in the direction of X-axis by means of a sliding member 4 engaged in a transverse slot 5 of frame 1. The tube guide frame 1 is further provided with a pair of rails 7 to guide a tube carrier 6 which can be reciprocated freely in the direction of Y-axis at right angles to the X-axis. Movements of the carrier 6 in the vertical direction and in the direction of the X-axis are controlled by castors 8. As shown in FIG. 5, the frame 1 is supported by a pair of rails 9 extending parallel to the X-axis, and by castors 10 which limit vertical movement as well as movement in the direction of the Y-axis.

There is a tube K which is mounted on the tube carrier 6 by means of universal supporting members 11 and 12 in such a manner that it may rotate freely around both X- and Y-axes. Numeral 13 represents a high tension cable which is arranged in such a manner that it will not interfere with the motion of the tube in the directions of the X- and Y-axes or its angular adjustment. There is a connecting rod 14 supported at a point M on a straight line including the focus of the tube K. The connecting rod 14 is constrained to pass point N, which is an intersection of a line, passing the center of a body section to be radiographed parallel with the Y-axis, and a vertical plane parallel with the X-axis, by means of a longitudinal slot in the rod 14. Thus the connecting rod 14 may be inclined in accordance with the travel of the tube K in the direction of the X-axis. This inclination is transmitted to an arm 18, fixed on the tube K, through a crank pin 17 supported by a crank shaft 16 and a pair of crank bearings 15 fixed to the tube guide frame 1 whereby the tube K is subjected to angular adjustment in such a manner that the center of the pencil of X-ray is always directed to the center of the body section, including the focus, as shown by arrows.

Figure 9A:
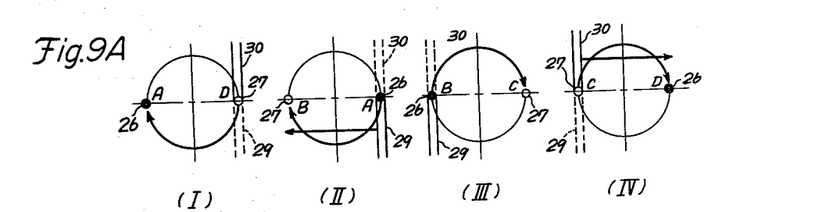
Figure 9B:
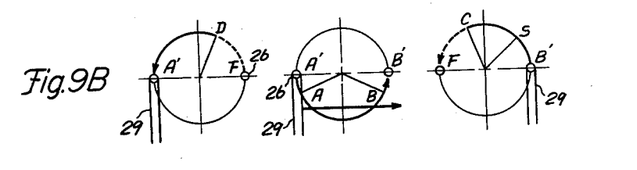

Numerals 19 and 20 represent gears having a gear ratio of 2:1. The gear 19 is so secured to a driving shaft 21 as to rotate the gear 20 twice during one rotation of the gear 19. A rotary arm 22 is secured to a shaft 23 coaxially with the gear 20 and has pins 24 and 25 at its opposite ends and spaced from the center by the radius $R_1$ so that pins 24, 25 are at an angle of 180° to each other. Two pulleys 26 and 27 mounted on the pins 24 and 25, respectively, are adapted to engage alternately with two sets of contact members 29 and 30, respectively, mounted on a rack mounting frame 28, by means of a mechanism described hereinafter and shown in FIG. 8, so as to give a reciprocating motion of a stroke of $2R_1$ to the rack mounting frame 28. Diagrams I, II, III, and IV of FIG. 9A illustrate four phases of this motion at angles of 180° to each other and where the pulley 26 is located at both dead points in the direction of X-axis. In the II stroke, the pulley 26 at one end of the rotary arm 16 begins engagement with a set of contact members 29 at the right-hand dead point. The arm 16 is rotated through an angle of 180° in the clockwise direction in FIG. 9 as indicated by an arrow while sliding the pulley 26 within a slot between two contact members 29 so as to displace the rack mounting frame 28 leftwards by $2R_1$ before the pulley 26 disengages from the slot at the left-hand dead point, as shown in III of A of FIG. 9. Meantime, the contact member 30 has been elevated by means of a mechanism, as described below and shown in FIG. 8, in order to prevent the same from collision with the pulley 27. Such a condition is illustrated by dotted lines in FIG. 8–E and FIG. 9–A. During a 180° rotation of the following III stroke, the contact member 29 is released from engagement with the pulley 26 so that the rack mounting frame is kept stationary of the end of the II stroke without displacement except on elevation of the contact member 29 which is effected by the following mechanism. There is a catch 31 (FIG. 8) at an end of the rotary arm 22 adjacent the pulley 27. During the above III stroke, the catch 31 is engaged with a sliding plate 32 provided on the side of the rack mounting frame 28, so as to slide the sliding plate leftwards in FIG. 8–B. By the leftward movement of the sliding plate 32, a lifting member 33 is lowered, a bell crank 34 is turned in the counterclockwise direction in FIG. 8–E, a connecting rod 35 is displaced downwards in FIG. 8–E, and bell cranks 36, 37 and 38 are turned also in the counterclockwise direction, so that the contact member 29 is lowered and the other contact member 30 is elevated simultaneously. By virtue of such a transposed situation of the contact member 29 and 30, the pulley 27 is inserted into contact with the contact member 30 at the left-hand dead point without an obstruction of the other contact member 29. During the following IV stroke (FIG. 9), the rack mounting frame 28 is displaced by the distance of $2R_1$ rightwards from the left-hand dead point to the right hand dead point in accordance with a rotation of the arm 22 through an angle of 180° while the pulley 27 is engaged with the contact member 30.

Figures 10A, 10B:
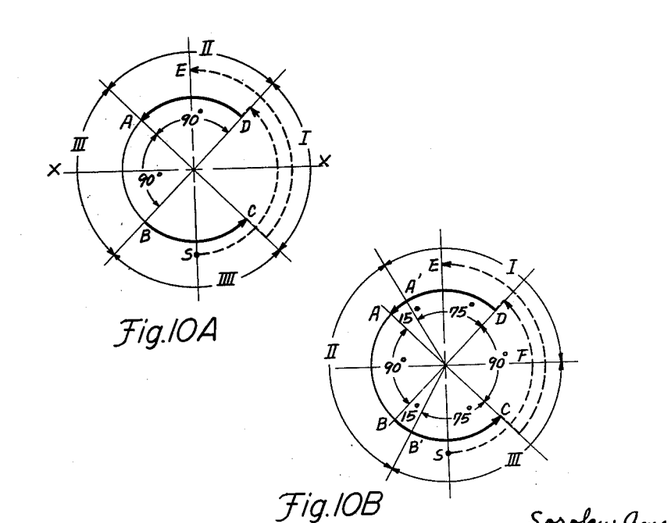

During the following I stroke, the rack mounting frame 28 is maintained stationary as during the III stroke and the contact member 30 is elevated and the other contact member 29 is lowered in the following manner. There is another catch 39 at the other end of the rotary arm 22 adjacent pulley 26, which is adapted to contact with a lever 40 provided on the opposite side of the rack mounting frame 28 as shown in FIG. 8–C. Thus the lever 40 is turned in the clockwise direction, as shown by a dotted arrow in FIG. 8–C. There is a transverse connecting shaft 41 and the lever 40 and another lever 42 are secured to opposite ends thereof. When the lever 40 is turned as above, the lever 42 is also turned counterclockwise, as shown by a dotted arrow in FIG. 8–B, whereby the sliding plate 32 is slid rightwards into its original position as shown in FIG. 8–B. This sliding motion of the sliding plate 32 lowers the lifting member, the bell crank 34 turns in the clockwise direction in FIG. 8–E, the connecting rod 35 is displaced upwards in FIG. 8–E, the bell cranks 36, 37 and 38 are turned in the clockwise direction in FIG. 8–E, and the contact member 29 is raised and the contact member 30 lowered simultaneously so as to contact the pulley 26 with the contact member 29 without contact with the other contact member 30. Thus a cycle of motion for an exposure of the radiography is completed when the II stroke is ready to begin. Numeral 43 (FIG. 8) indicates lever bearings. Numeral 44 (FIG. 8) indicates connecting shaft bearings. Numeral 45 (FIG. 8) indicates guides for the sliding plate 32. Because of the fact that the shaft 23 rotates twice during one rotation of the driving shaft 21, turning through an angle of 180° of the rotary arm 22 secured to the shaft 23 corresponds to turning through an angle of 90° of the rotary arm 2 secured to the shaft 21. Therefore, the four strokes I, II, III, and IV of the rotary arm 22 correspond to angular movements I, II, III, and IV of one rotation of the rotary arm 2, respectively, as shown in FIG. 10–A in which thick arrows indicate X-ray radiation periods.

Figure 7:
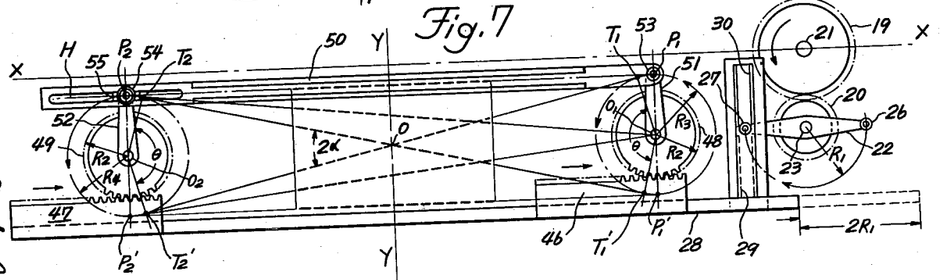
FIG. 7 is a plan view showing an arrangement of straight rails for guiding the tube.
Figures 8A, 8C:
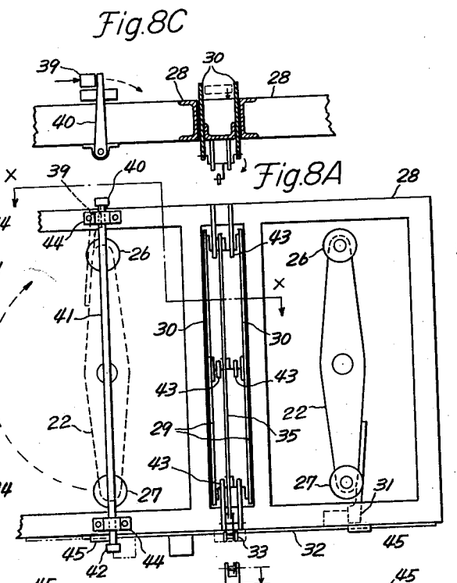
Figure 8B:
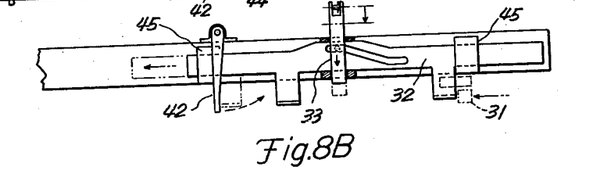
Figure 8D:
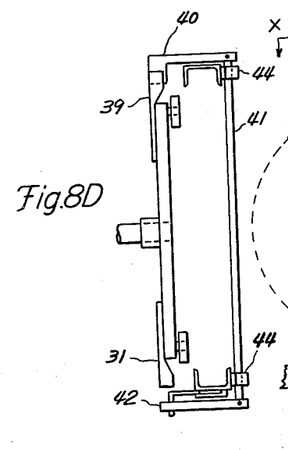
Figure 8E:
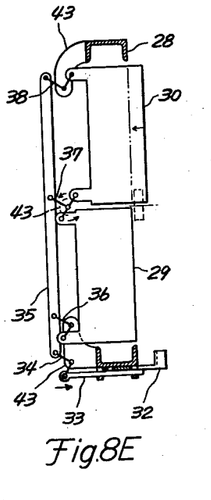

The rack mounting frame 28 has two racks 46 and 47 (FIG. 7) which are engaged with gears 48 and 49, respectively each having a radius of $R_2$. The gears 48 and 49 have actuating levers 51 and 52, respectively, secured thereto for displacing a tube guide rail 50. At radial distances $R_3$ and $R_4$ from the centers of the gears 48 and 49, the levers 51 and 52 have connecting pins 53 and 54, respectively. (If a parallel slipping or a X-shaped slipping is required $R_3=R_4$.) Either of the two pins, for example, the pin 53, is connected with the tube guide rail 50 directly but rotatably at an end thereof. The other end of the rail 50 is provided with a longitudinal slot having sliding member 55 adapted to be slidable therein. The other connecting pin 54 is connected with the sliding member 55 rotatably. Now it is desired to position the actuating levers at positions where lines which connect the center $O_1$ of the gear 48 with the center of the pin 53 and the center $O_2$ of the gear 49 with the center of the pin 54 may intersect the tube guide rail 50 at a right angle regardless of the kind of type of slipping. To this end, relation of length of the radius $R_1$ of the rotary arm 22, or between the center of the shaft 23 and the centers of the pulleys 26 and 27, to length of the radius $R_2$ of the gears 48 and 49 is determined as follows. As illustrated in FIG. 7, where positions of the tube guide rail 50 are indicated by dotted thick lines, the centers of the pins 53 and 54 are positioned at either $P_1$ and $P_2$ or $P'_1$ and $P'_2$ in case of a parallel slipping and at either $T_1$ and $T_2$ or $T'_1$ and $T'_2$ in case of an X-shaped slipping, respectively, simultaneouly, and in addition, $R_3=R_4=2R_1/\pi$, in case of the parallel slipping, and $R_2 \times \theta$ radians or length of the arc either from $T_1$ to $T'_1$ or from $T_2$ to $T'_2$ at an angle of $\theta=(\pi-2\alpha)$ is $2R_1$ in case of the X-shaped slipping where $2\alpha$ represents the slipping intersection angle.

When the above condition is satisfied, the relation in motion of the rotary arm 22 to the tube guide rail 50 is represented by a toggle motion. By virtue of such mechanism as above, it is possible to start and stop the relative member quite slowly and smoothly and, at the same time, there is no substantial transversal displacement of the tube guide rail 50 within the range of about 10° around the dead points, as shown in FIG. 13, so that the precision is not decreased even if there are a substantial shake and an error in mounting in this actuating system, making it easy to manufacture the apparatus.

Figure 13:
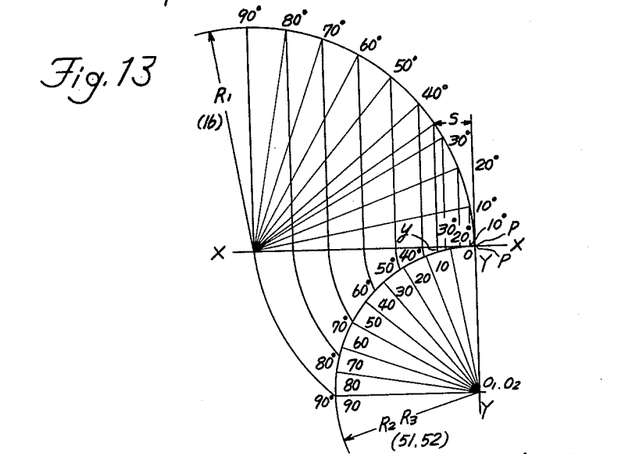
FIG. 13 is an explanatory diagram of a toggling mechanism.

The upper 90° sector diagram of FIG. 13 shows displacement S of the rack mounting frame 28 in the direction of the X-axis (along the straight line 0°P) at every 10° from the dead point P of the rotary arm 22. The lower 90° sector diagram of FIG. 13 shows displacement y of the tube guide rail 50 in the lateral direction derived from the displacement S of the rack mounting frame 28 transmitted to the tube guide rail 50 so as to rotate the latter through the intermediary of the racks 46 and 47 and the gears 48 and 49. There is a guide pin 56 (FIG. 3) on the bottom side of the tube carrier 6 secured thereto.

By means of the guide pin 56 and a sliding member 55 associated therewith and adapted to be slidable along the tube guide rail 50 longitudinally without any substantial friction, shake and inclination, the tube carrier 6 is connected with the tube guide rail 50.

Figure 11:
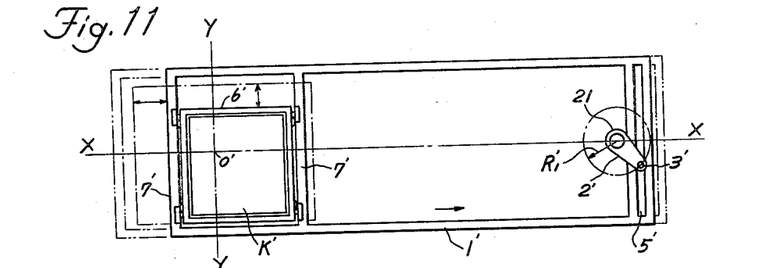
FIG. 11 is a plan view of a film guide frame.
Figure 12:
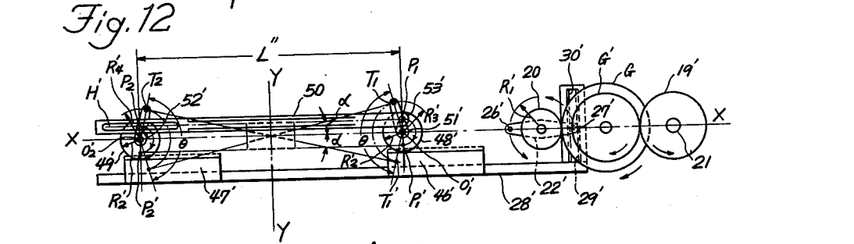
FIG. 12 is a plan view showing an arrangement of straight rails for guiding the cassette.

The description given hereinbefore relates to a mechanism for moving the tube, but a mechanism for moving the film is entirely the same except the direction of movement is not the same. That is, the displacement is symmetrical with respect to the center O of the body section in proportion of $n:m$. Therefore, apostrophized numerals in FIGS. 3, 11, and 12 correspond to non-apostrophized numerals except the former are used for the film side while the latter are used for the tube side. Further, there are such relations as $$R':R=R'_1:R_1=R'_2:R_2=R'_3:R_3$$

and $$L'':L'=n:m$$

However, it is practically impossible to shorten the distance $L''$ between $O'_1$ and $O'_2$ substantially. Therefore, the distance is determined depending upon a necessity in construction, as, for example, $L'/2$, necessary to determine the ratio $R'_3:R_3=\frac{1}{2}$ in order to equalize the slipping intersection angles $\alpha$. In case of the parallel slipping type, relation of $R'_3(=R'_4)R_3(=R_4)=n:m$ is required merely, because the length $L''$ may be disregarded.

There are provided a pair of direct-coupled coaxial gears G and G' between gears 19' and 20', as shown in FIG. 12, to which corresponding gears are not provided in the tube side mechanism. These gears G and G' are provided in order to clear the moving range of a rack mounting frame 28'. It is to be understood that such a provision is merely an embodiment not limiting of the invention, and the rear ratio of the gears 20' to 19' is 2:1 even if the gears G and G' are inserted. Furthermore, there is the fact that the line connecting the respective rotary shaft centers $O_1$ and $O_2$ of the actuating levers 51 and 52 does not coincide with the central line of slipping or the X-axis, as shown in FIG. 7, while the line connecting the respective rotary centers $O'_1$ and $O'_2$ of the actuating levers 51' and 52' coincides with the central line of slipping or the X-axis, as shown in FIG. 12. Such a fact is derived in order to avoid positioning the tube guide rail 50 directly under the radiation opening of the tube, while it is rather advantageous, in view of the operation, to guide a cassette carrier 6' through a passage including a point just under the center of the carrier 6'. It is to be understood that there are elevating mechanisms from 31' to 45' for contact members 29' and 30', the cassette carrier 6', and a guide pin 56', but they are omitted in the drawings for the sake of simplification. The cassette and the film are expressed by $K'$.

In order to facilitate an understanding of the mechanical principles of the apparatus in accordance with this invention, in the above mentioned embodiment, the revolution ratios between the gears 19 and 20 as well as 19' and 20' were made 2:1 for a complete twin straight lines slipping and the description relates to the following specified operation. That is, X-ray is radiated only for periods during which the rotary arm 2 is passing along arcs of angles of 90° not intersecting the X-axis, and not radiated for periods during which the arm 2 is passing along arcs of angles of 90° which intersect the X-axis, as shown by thick arrows for the former and thin arrows for the latter in FIG. 10–A. During the latter periods, the rotary arm 22 rotates through angles of 180° from one dead point to another dead point and displaces the tube guide rail 50 transversally in the manner of a toggle motion. Thus a radiographic operation is completed after one revolution of the rotary arms 2 and 2' and two revolutions of the rotary arms 22 and 22'. Practically speaking, it is insufficient to revolve the rotary arms 2 and 2' through an angle of 360° and other parts correspondingly, because acceleration and deceleration require periods corresponding to angles of about 135° for a constant speed revolution during the radiation of X-ray. Therefore, it becomes necessary to revolve the rotary arms 2 and 2' through an angle of 540° which comprises 270° of the net radiographic period and the doubled 135°. In other words, one and a half revolutions are required for one operation.

Accordingly, it becomes necessary to advance or reverse the rotary arms 2 and 2' through an angle of 180° so as to keep the relative positions of the tube and the film before a radiographic operation after the preceding operation is completed. Such a measure is necessary not only to load and unload the cassette but also to keep the relative positions of such controlling means as for start, stop, radiation, etc. always constant. Needless to say, when it is intended to finish one operation of radiographing with two revolutions, continuous operations can be carried out by virtue of the continuous revolution in the same direction without reverse revolution. However, when the working period from start till stop is extended, a breathing holding period required for a patient becomes disadvantageously longer. Furthermore, it is also disadvantageous to engender too great an amount of noise owing to the double reciprocation of the tube and the quadruple displacement of the tube guide rail. In view of the above facts, it is preferable to take a measure to shorten the working distance. To this end, the relative members should be reset quietly to the initial starting positions after an operation.

Meanwhile, as apparent from FIG. 13, a transversal displacement of the tube guide rail 50 corresponding to a rotary angle of the rotary arm 22 around a dead point is extremely minute due to the principle of the toggle mechanism described hereinbefore. For example, in case $R_2$ is 200 mm., the displacement is substantially zero at a point corresponding to a rotary angle of 10° from a dead point, the same is 2 mm. at 20°, and is around only 3 mm. at even 30°. Therefore, even if the transversal displacement of the tube guide rail 50 is advanced correspondingly to an angle of 15° of the revolution of the rotary arm 2 or from a point A to a point A' in FIG. 10–B at the start of the displacement and at the same time is extended correspondingly to an angle of 15° of the same revolution or from a point B to a point B' at the finish of the displacement, so as to carry out the displacement during the radiating period, an extremely slight curve is found at ends of a slipped straight line which is possible to be considered practically a true straight line. In addition, there is a 120° revolution of the rotary arm 2 with respect to a 180° revolution of the rotary arm 22 when the period of the displacement is modified as above, so that the revolution ratio becomes 3:2 and the revolution of the rotary arm 2 through an angle of 15° corresponds to a revolution of the rotary arm 22 through an angle of 22.5°, resulting in further shortening of the transversal displacement distance of the tube guide rail 50 down to about 3 mm. Thus it becomes too unobjectionable that the type of slipping becomes substantially linear. Moreover, the period during which the tube guide rail 50 is displaced transversally is extended in accordance with the ratio of 120°:90° resulting in substantial smoothing.

However, it is to be seen that, with respect to a 1.5 revolution of the rotary arm 2 including the start and stop periods, 2.25 revolutions of the rotary arm 22 are required and one reciprocation of the rack mounting frame 28 is completed for two revolutions of the rotary arm 22. Therefore, in order to reset the rotary arms 2 and 22 and the rack mounting frame 28 to the original starting position for an operation of radiography, the rotary arm 2 has to be turned reversely by 1.5 revolutions, considering that only after 12 revolutions of the arm 2 in the same direction with the radiating period the same, the same relative starting positions are found.

By virtue of the reverse revolution to the starting position for every radiographic operation, the return stroke of the rack mounting frame 28 the reverse of the advancing stroke thereof satisfactorily, necessitating only a single pulley 26 and a single contact member 29. In addition, it becomes needless to elevate the contact member 29 alternately. Therefore, it becomes unnecessary to provide not only the pulleys 27 and 27' and the contact members 30 and 30' but also the entire mechanism for elevating the contact members including parts 31 to 45 and 31' to 45' except parts 28 and 28', resulting in substantial simplification of the construction. Moreover, by virtue of the fact that the tube and the film guide rails 50 and 50' are displaced only once during a radiographic operation, the work becomes advantageously quieter. Therefore, it is preferable to adopt the approximative embodiment of this invention secondly described hereinbefore than the first described theoretical two straight line slipping embodiment, since, though the latter is described at first to facilitate the description, the former is superior to the latter in operation and also in construction.

The description given hereinbefore refers to the parallel slipping type and the X-shaped slipping type. In order to adapt the construction in accordance with the embodiments to the V-shaped slipping type, or to the inverted and separated V-shaped slipping type, the mechanisms should be suitably modified by means of changing the radii $R_3$ and $R_4$ or further reversing the direction of rotation of one of the actuating levers 51 and 52 to the other.

Figure 14:
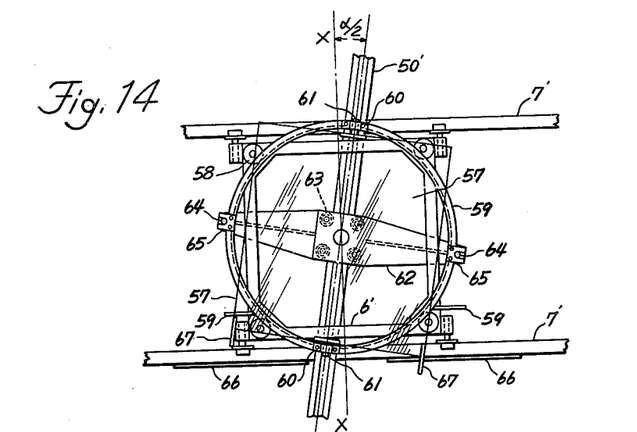
FIGS. 14, 15, 16, and 17 are views of a "Lysholm" focusing device.
Figures 15, 16:
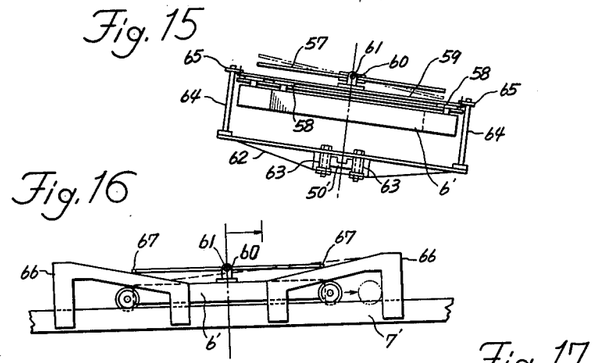

A focusing or "Lysholm" device in accordance with this invention will now be explained with reference to FIGS. 14 through 17. There is a device 57 attached to an annular frame wheel 59 by means of a pair of bearings 60 and shafts 61 arranged at both ends of a diameter of the wheel 59 in such a manner that the device 57 may be tiltable to an extent, on a central grid, with respect to the surface of the film. The wheel 59 is carried by a cassette carrier 6' by means of four castors 58 provided at the four corners of the carrier 6' and in engagement with the circumference of the wheel 59 in such a manner that wheel 59 may be rotatable on the center of the cassette carrier 6' in parallel with the surface of the film, as shown in FIGS. 14 and 15. (In FIG. 14, in order to illustrate the reverse, some parts are drafted transparently.)

There is a rotating member 62 carried by the film guide rail 50' by means of pulleys 63 in light engagement therewith so as to slide the rotating member 62 along the rail 50' following the motion of the cassette carrier 6' in such a manner that the grid is kept always in parallel with the film guide rail 50'. The rotating member 62 has two guide pins 64 provided at the ends of the arms thereof, and adapted to be in engagement with slots of forked members fixed to the wheel 59, so as to rotate the member 62 by means of the wheel 59.

Figure 17:
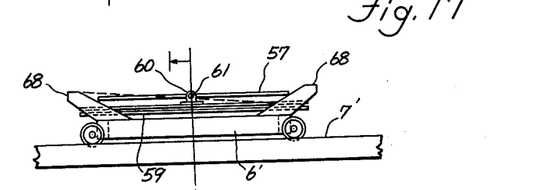

In case of the parallel slipping type, it is sufficient to provide the above-mentioned mechanism. However, when the parallel slipping is desired, it is preferred to provide inclined guide plates 66 rather than the above mechanism. As shown in FIGS. 14 and 16, the inclined guide plates 66 are attached to the cassette carrier guide rail 7' and contact members 67 are attached to the focusing device. By engagement of the contact members 67 with the inclined guide plates 66, the device is inclined in accordance with the distance between the center of the cassette carrier 6' and the X-axis (in the direction of the Y-axis) so that the normal to the focusing device always intersects the central grid line. FIG. 17 shows a further modified device for the V-shaped slipping type and the inverted and separated V-shaped slipping type. In combination with the devices for the parallel slipping type, for the X-shaped slipping type, inclined guide plates 68 are attached to the cassette carrier 6' so that the device is rotated and inclined simultaneously in such a manner that the normal to the device always intersects the central grid line.

There is a special case of the construction in accordance with this invention where the parallel slipping type is limited no displacement of the tube and the film in the direction of the Y-axis during the X-ray radiation period. In such a case, it is possible to displace the tube and the film in the direction of the Y-axis by displacing means attached to displacing frames movable in the direction of the X-axis, respectively and independently, of using the straight line guide rails. It is to be understood that the displacement is to be effected during the non-radiating period and that the displacement is to be symmetrically with respect to a point in the body section. It is advantageous to adopt a crank motion mechanism for such displacement, and which revolves only between the two dead points through an angle of 180° so as to smooth the action near the start and end of the displacement. Such a mechanism is simpler and acts more precisely.

As apparent from the foregoing explanations, the heretofore known disadvantages of the plane slipping type body section radiographic apparatus can be obviated entirely by virtue of this invention, and at the same time, a longitudinal body section radiographic apparatus by which the merit of the plane slipping type may be fulfilled substantially, and with which minimized unfavorable obstalce shadows, can be provided.

While particular embodiments of the invention have been illustrated and described, modifications thereof will readily occur to those skilled in the art. It should be understood therefore that the invention is not limited to the particular arrangements disclosed but that the appended claims are intended to cover all modifications which do not depart from the true spirit and scope of the invention.

What is claimed as new and desired to be secured by Letters Patent of the United States is:

1. In a plane slipping type body section radiographic apparatus including a tube carrier and a tube mounted on said tube carrier for movement in a plane parallel to a body section to be X-rayed; mechanism for moving said tube carrier parallel to said plane in selected directions relative to a pair of perpendicularly related first and second coordinates lying in said plane, comprising, in combination, a frame extending parallel to said plane and said first coordinate for guided movement longitudinally of said first coordinate; a pair of spaced parallel rails on said frame extending parallel to said plane and said second coordinate, and perpendicular to said first coordinate; said rails supporting said tube carrier for guided movement longitudinally thereof; crank mechanism, including a rotatable crank connected to said frame, operable to reciprocate said frame longitudinally of said first coordinate; a relatively elongated guide rail extending generally longitudinally of said first coordinate; driving elements connected to opposite end portions of said guide rail and each effective to reciprocate the respective guide rail end portion in a direction parallel to said second coordinate to effect bodily movement of said guide rail laterally of said first coordinate; a connecting element fixed to said tube carrier and slidably engaged with said guide rail to move said tube carrier along said spaced parallel rails in accordance with said bodily lateral movement of said guide rail; drive means interconnecting said drive elements for coordinated operation and connected to said crank mechanism for operation in synchronism with the latter; a film carrier disposed on the side of the body section to be X-rayed opposite said tube and arranged to move a film therein parallel to said plane; means supporting said film carrier for movement parallel to said plane; and operating mechanism operable in synchronism with said crank mechanism effective to move said film carrier parallel to said plane in selected directions relative to said pair of perpendicularly related first and second coordinates.

2. Mechanism as claimed in claim 1, including means on said frame mounting said tube for swinging movement about an axis parallel to said second coordinate and perpendicular to a plane including said first coordinate; and a control rod extending through said axis and having a point thereon spaced longitudinally from said axis constrained to remain at the focal point of said tube, said control rod being connected to said tube to swing the same about said axis to maintain said tube continually focused on selected portions of the section to be X-rayed.

3. Mechanism as claimed in claim 1, in which said operating mechanism includes a second frame extending parallel to said plane and said first coordinate for guided movement longitudinally of said first coordinate, a pair of second spaced parallel rails on said last-named frame extending parallel to said plane and to said second coordinate, and perpendicular to said first coordinate; said second rails supporting said film carrier for guided movement longitudinally thereof; second crank mechanism, including a second rotatable crank connected to said second frame, operable to reciprocate said second frame longitudinally of said first coordinate; a second relatively elongated guide rail extending generally longitudinally of said first coordinate; second drive elements connected to opposite end portions of said second guide rail and each effective to reciprocate the respective second guide rail end portion in a direction parallel to said second coordinate to effect bodily movement of said second guide rail laterally of said first coordinate; a second connecting element fixed to said film carrier and slidably engaged with said second guide rail to move said film carrier along said spaced parallel second rails in accordance with said bodily lateral movement of said second guide rail; and second drive means interconnecting said second drive elements for coordinated operation and connected to said crank mechanism for operation in synchronism with the latter.

4. Mechanism as claimed in claim 1, in which said driving elements comprise a pair of gears each having a crank rotatable therewith and having a free end connected to a respective end portion of said guide rail; said drive means including a pair of interconnected and longitudinally reciprocable racks each engaged with a respective one of said gears, and further including a rotatable crank means drivingly connected to said crank mechanism and engaged with said racks to so reciprocate the same.

5. Mechanism as claimed in claim 4, in which the speed ratio between said crank mechanism and said crank means is 2:1 whereby said crank means is rotated at twice the angular velocity of said crank mechanism; and means selectively operable, at the end of a first one half revolution of said crank means, to disestablish the driving connection between said crank means and said racks and to maintain said driving connection disestablished during the succeeding half revolution of said crank means; said driving connection disestablishing means being effective, at the end of the first full revolution of said crank means, to re-establish the driving connection between said crank means and said racks.

References Cited in the file of this patent
UNITED STATES PATENTS

| | | |
|---|---|---|
| 2,167,114 | Kieffer | July 25, 1939 |
| 2,207,867 | Loebell | July 16, 1940 |
| 2,353,145 | Chamberlain | July 11, 1944 |
| 2,370,163 | Hare | Feb. 27, 1945 |
| 2,793,296 | Peterson | May 21, 1957 |